(No Model.)  3 Sheets—Sheet 1.
H. L. SHIELDS.
HORSE HAY RAKE.
No. 368,787.  Patented Aug. 23, 1887.
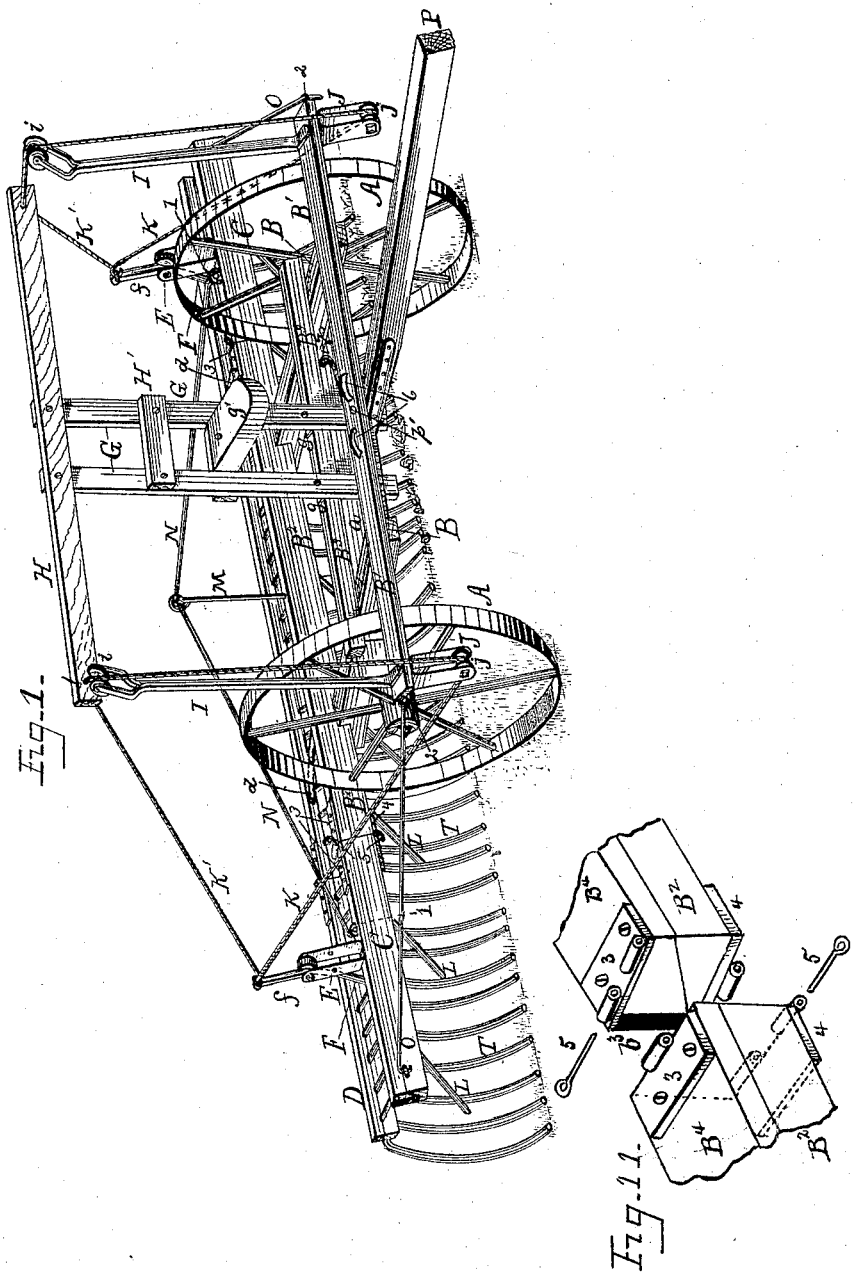
WITNESSES
INVENTOR
Hamilton Leroy Shields
By Wm. H. Brereton
Attorney

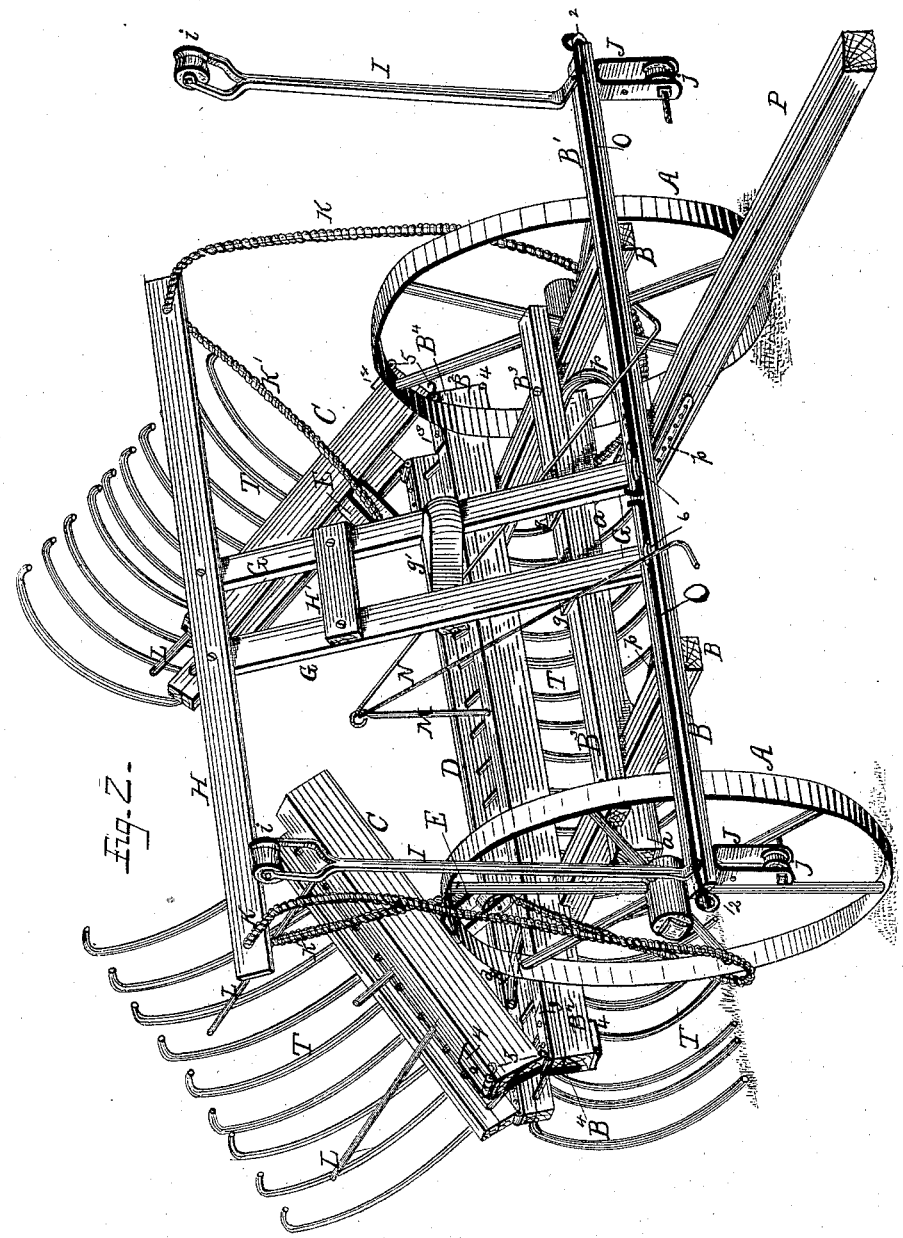

(No Model.) 3 Sheets—Sheet 3.
H. L. SHIELDS.
HORSE HAY RAKE.
No. 368,787. Patented Aug. 23, 1887.
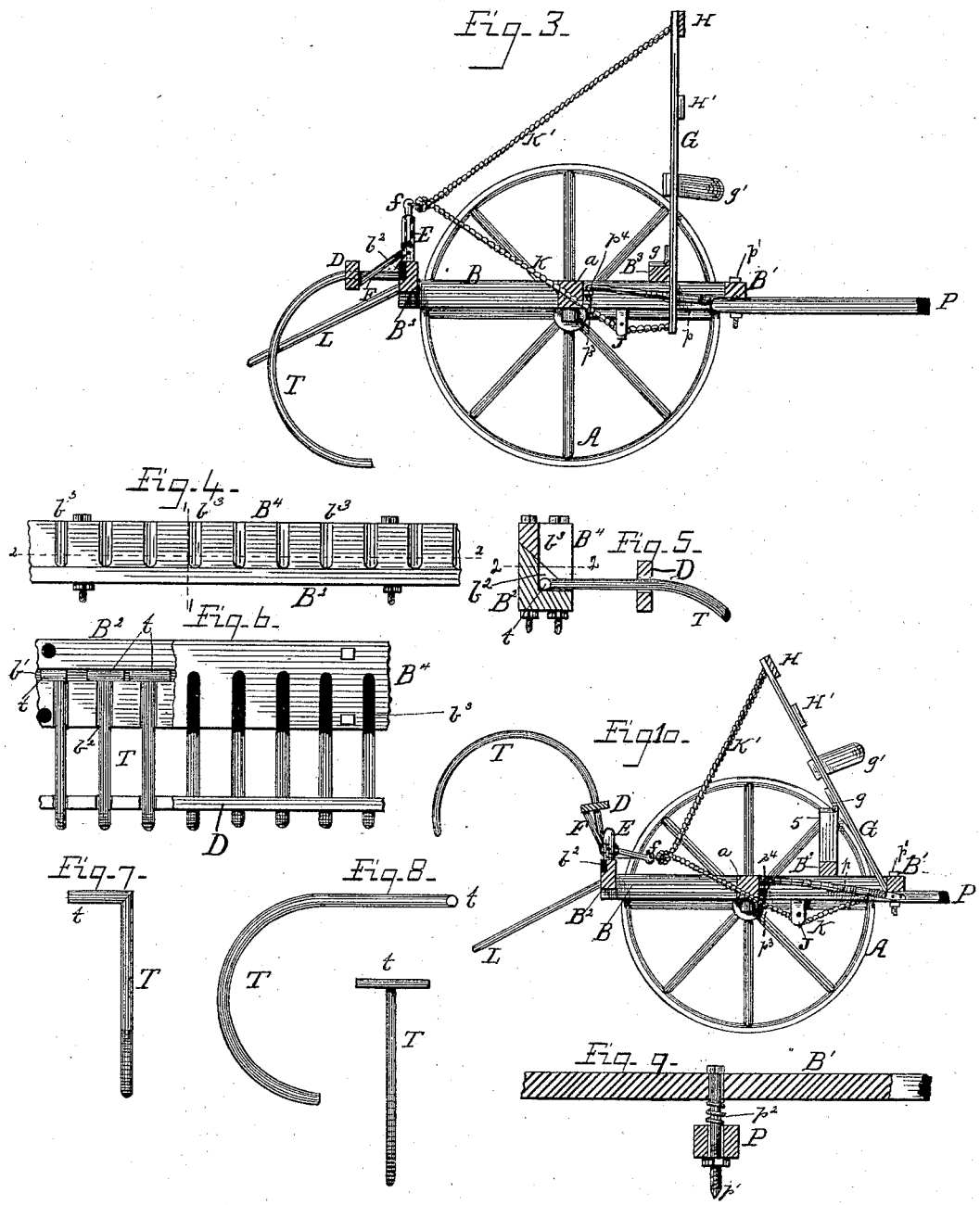
WITNESSES
INVENTOR
Hamilton Leroy Shields
By Wm. H. Brereton
Attorney

UNITED STATES PATENT OFFICE.

HAMILTON L. SHIELDS, OF TROY, NEW YORK.

HORSE HAY-RAKE.

SPECIFICATION forming part of Letters Patent No. 368,787, dated August 23, 1887.

Application filed March 22, 1887. Serial No. 231,968. (No model.)

*To all whom it may concern:*

Be it known that I, HAMILTON LEROY SHIELDS, a citizen of the United States, residing at Troy, in the county of Rensselaer and State of New York, have invented certain new and useful Improvements in Horse Hay-Rakes; and I do hereby declare the following to be a full, clear, and exact description of the invention, such as will enable others skilled in the art to which it appertains to make and use the same.

My invention is an improvement in horse hay-rakes; and my said invention consists in certain details of construction and arrangement of the parts composing the same, substantially as and for the purposes as will be hereinafter described in detail and form the subject-matter of the claims.

The object of this invention is to so construct the dumping devices of horse hay-rakes that the raising and lowering of the rake teeth is effected by the weight and strength of the driver exerted in a backward and forward motion of his body against a frame at his back which forms the main lever of the dumping devices, and also to provide a horse hay-rake that will, with the same team usually employed, accomplish twice or three times the amount of work of ordinary rakes.

For convenience in passing through farm-gates, bars, &c., the ordinary horse hay-rake rarely exceeds eight feet in width, and to suit uneven ground the wheels are outside the rake, and in self-dumping rakes the teeth fall of their own weight, jarring and injuring the machine. In the present instance the wheels are somewhat closer together, about six feet apart, thus making it easier for the team, while the width of the rake can be increased so as to take a swath twice or thrice the ordinary width—sixteen to twenty-four feet—thus saving not only one-half or two-thirds of the time usually employed in raking, but a corresponding saving in the distance traveled over by the team, and the dumping of the rake is effected by a backward movement of the driver's body, acting through his back and shoulders, against a lever of which his seat is a component part, thus furnishing a powerful leverage for elevating the rake-teeth, and, when the hay has been dumped, by simply resuming the upright posture the rake is lowered and held down to the ground. Thus the pressure of the shoulders and the extension of the legs, besides the weight of the body, are utilized in operating the rake, while the driver's hands are left free for managing his team.

For a better understanding of the details of construction and arrangement of a horse hay-rake when constructed in accordance with my invention, reference is now had to the accompanying drawings, forming a part hereof, and in which—

Figure 1 is a perspective view of an extension-rake of about double the ordinary capacity, with the wings extended in position ready for work; and Fig. 2 is a similar view illustrating the wings as folded over upon the machine when passing gates, &c., and going to and from the field. Fig. 3 is a vertical transverse sectional view illustrating a slight modification in the arrangement of the dumping devices when applied to rakes of ordinary width and construction. Fig. 4 is a rear view of a portion of the rake-head, showing the two members composing the same and the slots therein to permit the necessary vertical play of the teeth; and Figs. 5 and 6 are detailed sectional views thereof on the lines 1 1 and 2 2, respectively, of Fig. 4. Figs. 7 and 8 represent front and side elevations, respectively, of the rake-tooth. Fig. 9 is a transverse section through the pole or tongue for the team, showing the manner of fastening the same to the front of the machine-frame. Fig. 10 is a sectional view similar to Fig. 3, showing the rake-teeth in their elevated position and the seat-standards hinged near the seat. Fig. 11 is a detail view on an enlarged scale, illustrating the construction of the hinges with their removable pintles, which connect the sections of the rake-head.

To construct the rake I proceed as follows: On an axle, $a$, are short arms for wheels A A, upon which the machine is supported. Across, horizontally and perpendicularly to the axle, is a rectangular frame composed of five pieces, B, B, B', B², and B³. The two side pieces, B B, rest upon and are secured to the axle $a$, while the two pieces B' B² are arranged at right angles to and are secured to the front and rear ends, respectively, of the side pieces B B. These pieces B' B² also extend, the one B' in front and the other, B², in rear of the wheels A and laterally beyond them. The front bar, B', forms the foot-rest for the driver and support for the pole P, for the attachment of the team to the machine, and the rear bar, B², forms the rake-head proper, while the one B³ forms the support for the driver's-seat frame. The rake-head is composed of two parts, B² and B⁴, as seen in Figs. 4 and 5, which are bolted together, as in Figs. 5 and 6, and to the side pieces, B B, of the frame, and extends parallel with the axle $a$. The lower part, B², of this rake-head is grooved throughout its entire upper face, as at $b'$, to admit the angle end $t$ of the rake-teeth T therein, and so slotted at regular intervals, as at $b^2$, to admit vertical play of said teeth. The upper part, B⁴, of the rake head is to hold the rake-teeth in the groove in the lower part, B², and it is also slotted, as at $b^3$, to correspond with the slots $b^2$ in the lower part and permit the proper movement of the rake-teeth, and to each end thereof are hinged wings C C, made up exactly with groove and slots as the center part, B² B⁴, of the rake-head, and, in connection with said center part, form the rake-head entire.

Parallel to the rake-head, and about one foot from it, is a bar, D, through which are holes at regular intervals to correspond with the slots in the rake-head through which the rake-teeth pass, and are thereby kept in their relative and parallel position in regard to each other. This parallel bar has hinged wings of the same length as those of the rake-head, and is held fast to said rake-head by diagonal braces, as at $d$, near its ends.

Bolted on the top face of the rake-head B⁴ are brackets E, in which are so pivoted as to allow of their free vertical motion bent levers having a long arm, F, and a short arm, $f$, for the purposes as will presently appear.

Hinged, as at $g$, to the upper side of cross-piece B³ of the frame (which piece is fastened to the side pieces, B B, just in front of the axle and parallel with it) is a light rectangular frame-work, the uprights G of which support a seat, $g'$, for the driver, which seat is about one and one-half foot above the cross-piece B³, while the uprights G extend about four feet above said piece B³. Horizontally across and near the top of these uprights are bolted cross-pieces H H', the one H of the same length as the central part of the rake-head. The cross-piece H' forms the shoulder-rest for the driver, whereon his strength is exerted to dump the rake.

On the top, at each end of the cross-piece B', is secured a vertical rod, I, at the top of which a pulley, $i$, is journaled, and on the under side of said piece B', at each end thereof, immediately beneath the uprights I, are secured depending brackets J, also with a pulley, $j$, journaled therein.

To the short arms $f$ of the lever F, pivoted upon the top of the rake-head, as before explained, are attached small chains or strong ropes or cords K K', one of which, K, passes forward and downward beneath the pulley $j$, thence upward and over pulley $i$, and to the cross-bar H, where it is secured, while the other one, K', passes directly forward and upward, and is also secured to the said bar H. The pulleys $i j$ and lever F $f$ should be in the same vertical plane.

L L are the cleaning-sticks for the rake, which are secured in the lower part of the rake-head and incline somewhat downward between the rake-teeth, so as to detach the hay from the rake-teeth when said teeth are raised.

To stiffen so long a rake, I bolt on top of the center of the rake-head an upright iron bar, M, and from its top extend two iron rods, N N, whose ends hook in eyes $i$ on the top of the center of the wings, as shown in Fig. 1, and similar rods, O, extend from near each outside end of said wings and hook in eyes 2 on the ends of the front cross-piece, B', of the frame. These rods hold the rake securely to the ground, and yet admit of raising the teeth when desired. In passing to and from the field these rods, as well as the chains or cords K K', are, after the rake-teeth have been raised, unhooked and the wings folded over back vertically onto the center of the rake-head, as shown in Fig. 2.

To increase the strength of the joints, hinges are applied to both the top and bottom of the rake-head and wings, as shown at 3 4, Figs. 1, 2, and 11, which are adapted for extension to increase the width of the machine, and the pintles 5 of these hinges are not riveted, as usual, but may be readily withdrawn, whereby, while the parts are securely held together, they may be readily separated when not desired for use or to change their position.

Because of the driver's seat being placed on the cross-bar B³ in front of the axle, the driver's weight acts to counterbalance the weight of the rake-teeth and relieve undue pressure thereof upon the ground.

Referring again to the lever F, pivoted in the bracket at the top of the rake-head, to the short arm $f$ of which the chain or cords K K' are secured, the other or long end of said lever projects downward and rearward and is secured to the tooth-bar D, through which the rake-teeth pass, whereby said bar may be raised or lowered, and with it the rake-teeth. When, therefore, it is desired to dump the rake, the driver presses his body backward, with his feet braced against the foot-bar B', which may be provided with stirrups 6, to prevent his feet slipping, so as to exert his strength against the shoulder-rest H'; the standards G of which being hinged at $g$ to the cross-piece B³ said part H is carried backward, and because of the chain or cords K being secured to said cross-bar H pressure is exerted upon the said lever F through said cord K, and, through its long arm engaging the tooth-bar D, said tooth-bar is raised, and with it the entire set of rake-teeth. When the hay has been discharged, the driver gradually assumes his normal or vertical posture, at the same time drawing forward his seat and its supports, which, acting through the short cord or chain K', draws upon the lever F, and through it the tooth-bar D is brought back to its first position, both movements of the driver acting through his hinged back-rest in direct connection with the lifting-lever secured to said teeth. No quick or sudden falling back upon the ground with injury to the parts of the rake is therefore possible in this construction of dumping mechanism, and the parts thereof being very simple and few in number, they may be applied to any ordinary hay-rake now in use and by the farmers themselves without sending the machine to the factory or the employment of skilled labor, as is generally found necessary when repairing self-dumping rakes as now made.

To draw the rake, either one or two horses are used. If the extra large extension-rake be used, with wings at both sides, two horses will be necessary, in which case a pole, as at P, is provided, to the inner end of which a bail, $p$, is secured, whose hook end $p^3$ enters eyes $p^4$, Figs. 3 and 10, on the axle $a$, whereby a hinged connection is effected between the axle and pole, and in addition to this said pole is secured to the foot-bar B' by a bolt, $p'$, with a spring, $p^2$, between said bar and pole, so as to permit some vertical play of the pole, as shown in detail, Fig. 9; or this spring may be omitted, as shown in Figs. 3 and 10, in which case the pole is bolted directly to the foot-bar B'.

Although having described and shown an extension-rake, yet it is apparent that the devices for dumping the rake here shown may be applied with equal success to the usual form of single rakes now in use, in which instance it is not necessary to extend the foot-bar B' laterally beyond the wheels, and instead of employing a lever at each end of the rake, with its corresponding upright and pulleys on each end of the foot-bar, a single lever at the center of the rake-head may be employed, connected by its two chains or cords to the top and bottom, respectively, of the hinged frame G of the driver's seat, as in Fig. 3, in which case the upright rods I are dispensed with; and, if desired, the uprights G may be hinged to a support, 5, from the bar B, just below the driver's seat, as at $g$, Fig. 10, instead of to the cross-piece $B^3$ of the frame, whereby a still further movement backward of the top portion of the seat-frame is provided for in case a very high movement of the rake-teeth is desired; but the arrangement first shown and described is preferred, and will generally be found sufficient to accomplish the desired result.

It will be observed that in this rake the rake-head remains stationary, while the rake-teeth move vertically in slots formed in said rake-head, instead of the rake-head itself turning, as in most self-dumping rakes. Merely the weight of the teeth and their connecting-bar is all that has to be overcome when dumping this rake. Less power is therefore required than when the rake-head is revolved. The mechanism necessary to accomplish this revolution of the rake-head is therefore dispensed with in this instance.

To dump such a long rake as here contemplated requires a strong leverage, especially so should the hay be heavy, and this is the case not unfrequently with rakes of ordinary construction where a hand-lever is employed, to manipulate which lever the entire strength of the driver is often required. Consequently his attention is directed away from his team, and must be jointly employed to direct the team and operate the dumping mechanism, causing frequent mistakes in both operations. The advantage, therefore, of this mechanism for dumping the rake herein shown and described, in addition to the greatly-increased power obtained thereby, is, the driver's hands are left entirely free to manage his team, which is of great benefit to him and adds greatly to the success of the operation of raking hay, which quite frequently has to be done hurriedly and without a moment's unnecessary delay.

By reference to Fig. 3 it will be seen that the uprights G of the driver's seat extend slightly below the frame of the machine, whereby the backward movement of said standards is limited by said lower projecting ends thereof engaging beneath the foot-bar B'; and instead of carrying the chain or cord K beneath a pulley at the side of the frame it may be secured directly to the lower end of said standards, and the other cord, K', attached directly to the top of said uprights, this being sufficient in small rakes of the usual construction, where but a single lever is employed at the center of the rake-head.

I am aware that it is not new to provide horse hay-rakes with hinged extension-wings, for this is shown in a patent granted me June 27, 1882, No. 260,056, and also that the driver's seat has before been connected with the devices for dumping the rake. This therefore I make no broad claim to; but What I do claim as new and of my invention is as follows, viz:

1. In a horse hay-rake, the combination, with a suitable frame and rake-head carrying the rake-teeth, adapted to be vertically movable to discharge the load of hay, of a vertically-arranged frame hinged at its lower end to the frame of the machine and supplying a seat and shoulder-rest for the driver, and suitable connections with said frame and the rake, whereby said rake may be dumped and held to the ground by the backward and forward movement of the driver's body exerted through his back upon the frame behind him.

2. In a horse hay-rake, the combination, with the frame composed of the two side bars, B B, secured upon the axle and to the rake-head $B^2$, front bar, B', of equal length with said rake-head, and bar $B^3$, parallel thereto, secured to the side bars, B, in front of the axle, of the uprights G, hinged to said bar $B^3$, with seat $g'$ for the driver, arranged about midway of its length, and suitable connections with said hinged uprights and the rake, whereby said rake is dumped by the backward movement of the driver's body exerted upon said hinged uprights at his back, substantially as described, for the purposes specified.

3. In a horse hay-rake, the combination, with a suitable frame and rake-head made in three sections, the outer sections being capable of being removed or folded over upon the central section, and with teeth vertically movable in said rake-head to discharge the load of hay, of a vertically-arranged frame hinged to the frame of the machine and supplying a seat and shoulder-rest for the driver, and suitable connections with said frame and the rake, whereby said rake is dumped by the backward pressure of the driver's body upon the frame at his back and without assistance from his hands.

4. In a horse hay-rake, the combination, with the rake-head made in three sections, the outer sections being capable of being removed or folded over upon the central section, of the vertical bar M and rods N N, extending from the center of the rake to each extremity of the wings, substantially as described, for the purposes specified.

5. In a horse hay-rake, the combination, with the rake-head made in three sections, the outer sections being capable of being removed or folded over upon the central section, vertical bar M upon the center of the central section, and rods N N, extending from the top of said bar M to each extremity of the outer sections of the rake, of the rods O O, extending diagonally from the outer extremity of the said outer sections of the rake to the front cross-bar, B', of the machine-frame, and said front cross-bar, B', of the frame made to extend slightly laterally beyond the wheels, substantially as described, for the purposes specified.

6. In a horse hay-rake, the combination, with the rake-head carrying the rake-teeth made capable of vertical movement, and parallel bar D, the pivoted bent levers F $f$, engaging said bar, and chains or cords K K', secured to said levers and to the hinged frame on opposite sides of its pivot, of the driver's seat, combined with said rocking-seat frame, substantially as described, for the purposes specified.

7. In a horse hay-rake, the combination, with a suitable frame, rake with teeth capable of vertical movement to dump the hay, vertical supports G for the driver's seat, hinged to said frame, with shoulder-rest H' above said seat, and foot-bar B', of the vertical rods I, with rollers at their ends secured to the top of the foot-bar B', depending brackets J J, with pulleys $j\ j$, secured beneath said bar B', cords or chains K K', and levers F $f$, pivoted to the rake-head and fastened to the cords K K', substantially as described, for the purposes specified.

8. In a horse hay-rake, in combination with a suitable frame and rake with teeth capable of vertical movement to dump the hay, the vertical standards or supports for the driver's seat, hinged to the said frame and extending slightly below the same and above the driver's seat to form a bearing for the driver's back, whereby the same is operated, with suitable connections with said standards and the rake, whereby said rake is operated by the backward and forward movement of the driver's body without assistance from his hands.

9. In a horse hay-rake, in combination with a suitable frame and rake whose teeth are capable of vertical movement, the rake-head formed in two sections, $B^2\ B^4$, longitudinally bolted together and each formed with vertical transverse slots $b^2\ b^3$ therein to permit vertical movement of the teeth, and a longitudinal groove, $b'$, to receive the angle ends $t$ of said teeth, combined with a bar, D, parallel to the rake-head, through which the teeth pass, said teeth formed with angular ends $t$, and cleaning-sticks L, substantially as described, for the purposes specified.

10. In a horse hay-rake, in combination with a suitable frame and a rake whose teeth are capable of vertical movement, the vertical standards for supporting the driver's seat extending above said seat and hinged to said machine-frame just below the said seat, and supplied with a back-rest for the driver, whereby the dumping devices are operated by the pressure of the driver's back upon the frame behind him and without assistance from his hands.

11. The combination, in a horse hay-rake, with a suitable frame, rake-head with teeth capable of vertical movement, and suitable connections, of a seat for the driver, hinged to the machine-frame and formed with a back-rest, which back-rest is connected directly to and forms a part of the dumping devices, combined with said dumping devices, whereby said rake is operated solely by the pressure of the driver's body upon the frame at his back.

12. In a horse hay-rake, the combination, with a suitable frame, the rake whose teeth are capable of vertical movement, rake-head in which said teeth are held and move vertically, and bar D, through which the rake-teeth pass, of a seat-frame for the driver, hinged to the machine-frame and formed with a back-rest and a lower extension, with suitable connections between said seat-frame and rake, such as the chain or cords K K' and lever F $f$, substantially as described, for the purposes specified.

HAMILTON L. SHIELDS.

In presence of—
  GEO. F. NICHOLS,
  W. H. McLOUGHLIN.